(12) United States Patent
Jakes et al.

(10) Patent No.: US 8,288,994 B2
(45) Date of Patent: Oct. 16, 2012

(54) MANAGEMENT OF FAST BATTERY CHARGING IN MOBILE DEVICES

(75) Inventors: Philip J. Jakes, Durham, NC (US); Jennifer G. Zawacki, Hillsborough, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 777 days.

(21) Appl. No.: 12/059,434

(22) Filed: Mar. 31, 2008

(65) Prior Publication Data

US 2009/0243552 A1    Oct. 1, 2009

(51) Int. Cl.
*H02J 7/00* (2006.01)
*H02J 7/16* (2006.01)

(52) U.S. Cl. ........ 320/124; 320/125; 320/127; 320/137; 320/134; 320/160

(58) Field of Classification Search .............. 320/160, 320/125, 161, 162, 114, 115, 111, 124, 127, 320/133, 155, 134, 135, 136, 132, 138, 148, 320/149

See application file for complete search history.

(56) References Cited

U.S. PATENT DOCUMENTS

| | | | | |
|---|---|---|---|---|
| 5,477,126 A * | 12/1995 | Shiojima | ................ | 320/138 |
| 5,640,079 A * | 6/1997 | Nelson et al. | ................ | 320/153 |
| 5,777,399 A * | 7/1998 | Shibuya | ................ | 307/66 |
| 5,986,437 A * | 11/1999 | Lee | ................ | 320/162 |
| 6,215,282 B1 * | 4/2001 | Richards et al. | ................ | 320/160 |
| RE40,223 E * | 4/2008 | Koike et al. | ................ | 320/125 |
| 7,723,958 B2 * | 5/2010 | Darilek | ................ | 320/132 |
| 7,825,636 B2 * | 11/2010 | Partin et al. | ................ | 320/160 |
| 7,839,121 B2 * | 11/2010 | Kim | ................ | 320/124 |
| 7,944,178 B2 * | 5/2011 | Tamezane | ................ | 320/132 |
| 7,965,062 B2 * | 6/2011 | Kishi et al. | ................ | 320/160 |
| 7,982,432 B2 * | 7/2011 | Salman et al. | ................ | 320/130 |
| 8,018,204 B2 * | 9/2011 | Bourilkov et al. | ................ | 320/137 |
| 2003/0184262 A1 * | 10/2003 | Makhija | ................ | 320/130 |
| 2005/0017683 A1 * | 1/2005 | Smallwood et al. | ................ | 320/128 |
| 2005/0134225 A1 | 6/2005 | Mese et al. | | |
| 2005/0184705 A1 * | 8/2005 | Gawell et al. | ................ | 320/160 |
| 2006/0049805 A1 * | 3/2006 | Tran | ................ | 320/149 |
| 2006/0261780 A1 * | 11/2006 | Edington et al. | ................ | 320/130 |
| 2007/0029970 A1 * | 2/2007 | Barsukov et al. | ................ | 320/130 |
| 2008/0036426 A1 * | 2/2008 | Kung et al. | ................ | 320/160 |
| 2008/0309293 A1 * | 12/2008 | Kung et al. | ................ | 320/160 |
| 2010/0194341 A1 * | 8/2010 | Anupindi et al. | ................ | 320/118 |

* cited by examiner

*Primary Examiner* — Edward Tso
*Assistant Examiner* — Alexis Boateng
(74) *Attorney, Agent, or Firm* — Ference & Associates LLC

(57) ABSTRACT

For laptops or other mobile devices, a battery charging arrangement wherein fast-charging and/or slow-charging is governed by something other than a fixed, immovable battery level threshold. Particularly, a variable threshold is broadly contemplated herein which may be governed by any of a very wide variety of conceivable factors, including (but by no means limited to) information relating to a user's schedule or calendar, especially as regards "free" time when a user is not using a computer. Accordingly, if there is a long uninterrupted period of computer "downtime" (i.e., when a user is not using the computer), the battery level threshold below which fast-charging takes place can be lower. By the same token, for short periods of computer downtime, this threshold can be higher. In this manner, fast-charging is reserved only for the most compelling, time-based circumstances.

17 Claims, 4 Drawing Sheets ent of the present invention, there is broadly contemplated
MANAGEMENT OF FAST BATTERY CHARGING IN MOBILE DEVICES

FIELD OF THE INVENTION

The present invention relates generally to arrangements for charging and managing battery power in mobile devices such as laptops.

BACKGROUND OF THE INVENTION

The charging of batteries, such as lithium-ion (Li-Ion) batteries, in laptop (or notebook) computers, and for other mobile devices, has long presented challenges to test the patience of users. Typical "slow" charging of batteries (or "slow-charging") can take 6 to 8 hours. For this reason, many batteries, and mobile devices which use them, are able to employ "fast-charging" at times.

Fast-charging permits a battery to reach up to about 80% of capacity in as little as 60 to 90 minutes. While this is convenient and presents immediate practical benefit, it has the disadvantage of reducing, over time, the life span of the battery. Accordingly, it is conventionally known to provide a charging arrangement whereby fast-charging is reserved essentially for contingent circumstances, e.g., fast-charging will only take place when the battery level (also known as battery "charge") is below a threshold (in terms, e.g., of a percentage of the battery's capacity) and more slowly when over that percentage.

While such a solution admirably reduces long-term wear on the battery by avoiding a fast charge when nominally not needed, it still circumvents what could be more efficient and useful manners of managing battery charging and of thereby reducing even more the likelihood of long-term wear. Particularly, in view of the possibility that users may not even require a fast charge in instances outside of those imposed by a fixed and immovable battery level threshold, a compelling need has been recognized in connection with improving upon this inflexibility.

SUMMARY OF THE INVENTION

In accordance with at least one presently preferred embodiment of the present invention, there is broadly contemplated herein a battery charging arrangement wherein fast-charging and/or slow-charging is governed by something other than a fixed, immovable battery level threshold. Particularly, a variable threshold is broadly contemplated herein which may be governed by any of a very wide variety of conceivable factors, including (but by no means limited to) information relating to a user's schedule or calendar, especially as regards "free" time when a user is not using a computer. Accordingly, and by way of a non-restrictive and illustrative example, if there is a long uninterrupted period of computer "downtime" (i.e., when a user is not using the computer), the battery level threshold below which fast-charging takes place can be lower. By the same token, for short periods of computer downtime, this threshold can be higher. In this manner, fast-charging is reserved only for the most compelling, time-based circumstances.

In summary, one aspect of the invention provides an apparatus comprising: a mobile device; a battery for providing power to the mobile device; a medium for connection to an AC power source; and a battery charge manager which manages charging of the battery during connection of the connection medium with an AC power source; the battery charge manager acting to fast-charge the battery below a predetermined threshold condition and slow-charge the battery above the predetermined threshold condition; the battery charge manager further acting to vary the predetermined threshold condition.

Another aspect of the invention provides a method comprising: connecting a mobile device to an AC power source; thereafter charging a battery of the mobile device; and managing the charging of the battery via fast-charging the battery below a predetermined threshold condition and slow-charging the battery above the predetermined threshold condition; the managing comprising varying the predetermined threshold condition.

Furthermore, an additional aspect of the invention provides a program storage device readable by machine, tangibly embodying a program of instructions executable by the machine to perform a method comprising: connecting a mobile device to an AC power source; thereafter charging a battery of the mobile device; and managing the charging of the battery via fast-charging the battery below a predetermined threshold condition and slow-charging the battery above the predetermined threshold condition; the managing comprising varying the predetermined threshold condition.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Figure 1:
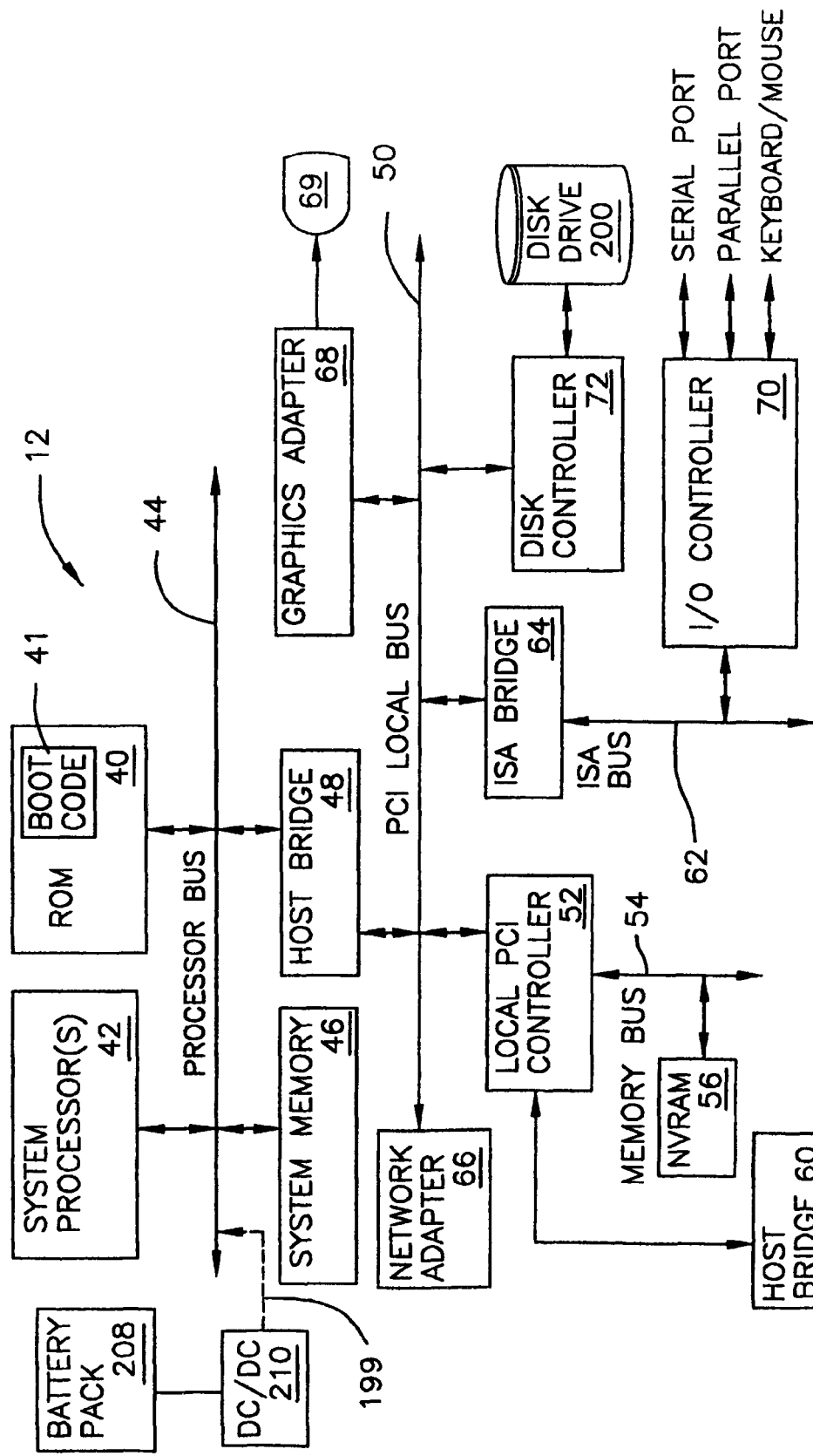
FIG. 1 schematically illustrates a computer system.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system. Notebook computers may alternatively be referred to as "notebooks", "laptops", "laptop computers" or "mobile computers" herein, and these terms should be understood as being essentially interchangeable with one another.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

Further illustrated in FIG. 1 is a battery pack 208 and DC/DC converter 210 which connect, via a connection 199, to the general system 12 at, e.g., processor bus 44.

Figure 2:
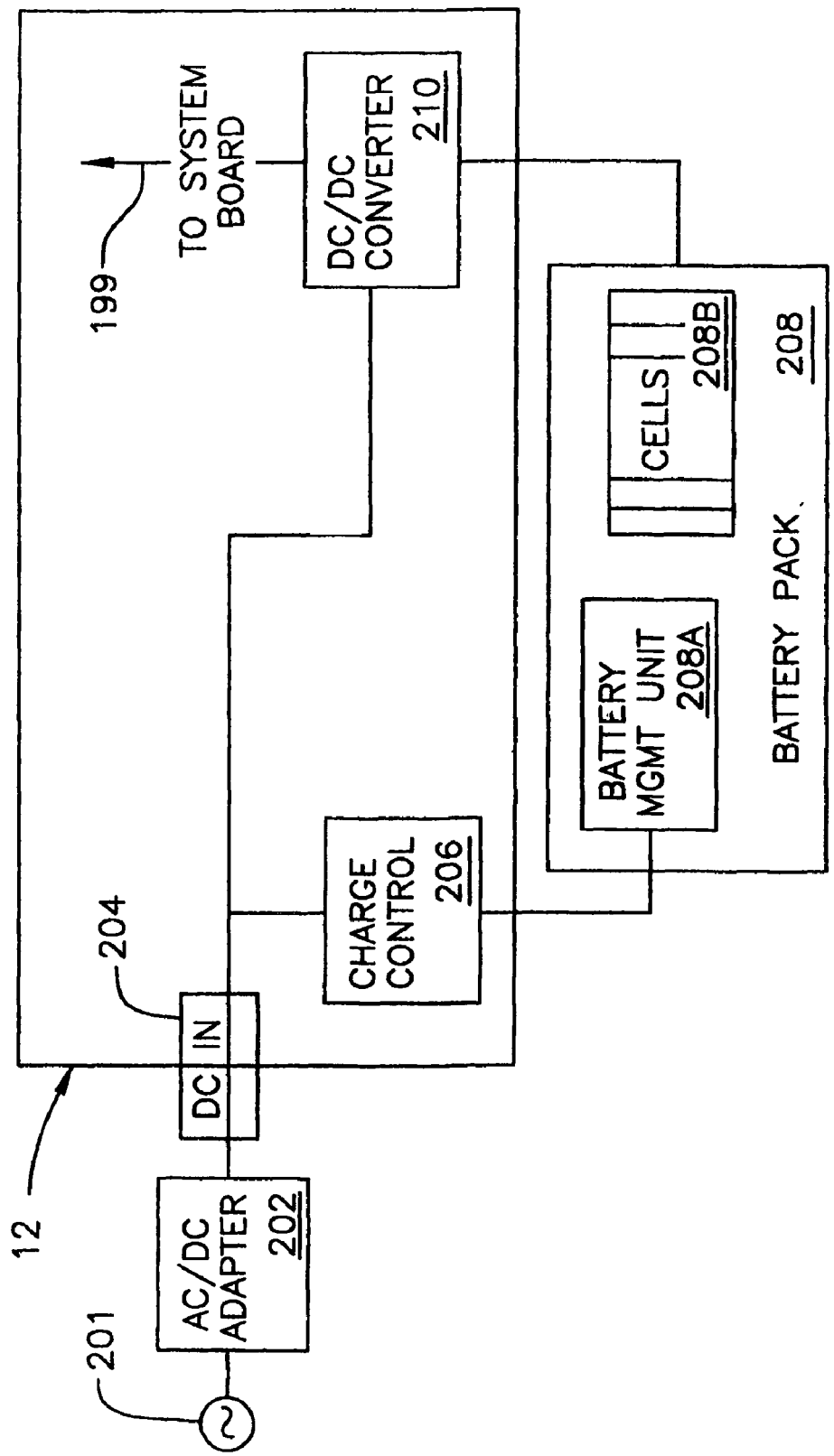
FIG. 2 schematically illustrates a computer system and battery pack.

FIG. 2 schematically illustrates a computer system 12 with a conventional battery and brick arrangement. As shown, a wall outlet 201 can accommodate a plug (not shown in detail) extending from a wire which itself leads to an AC/DC adapter, or "brick", 202. In turn, a wire from here typically can be plugged into a DC input or jack 204. Accordingly, this normally constitutes one distinct system arrangement for powering a computer and (as is well known) recharging a battery pack.

For its part, battery pack 208 is typically freely integrable into, and removable from, a system 12; here, it is shown separately from system 12 merely for the purpose of clearer illustration. Typically, battery pack 208 will include a battery management unit 208a and battery cells 208b, wherein the management unit 208a, as is very well known, manages the charge provide to and from cells 208b so as to facilitate, respectively, recharging of the cells 208b and powering of the system 12.

Brick 202 and battery pack 208, for their part, both feed into a DC/DC converter 210 as is well-known, and this in turn serves to power the system 12 (via connection 199). Further, a charge control arrangement 206 is typically included to facilitate the charging of battery cells 208b by the DC power source (which includes adapter or brick 202). Generally, charge control arrangement 206 will communicate with the battery management unit 208a so as to ascertain the state of battery cells 208b and to determine the level of current (originating here from AC/DC adapter 202) needed to be provided to cells 208b by way of recharging, or continuing to recharge, the cells 208b.

In accordance with a presently preferred embodiment of the present invention, charge control arrangement 206 may preferably be configured to apply to battery cells 208b a slow charge or fast charge as governed by a variable threshold. Whereas, in conventional arrangements, a threshold (defined in terms of battery level), below which fast-charging would take place and above which slow-charging would take place, is fixed, here it may be variable in accordance with any of a very wide variety of possible factors, including user-related factors. Alternatively, battery management unit 208a may be configured to manage the charge protocol, alone or in combination with charge control arrangement 206.

Figure 3:
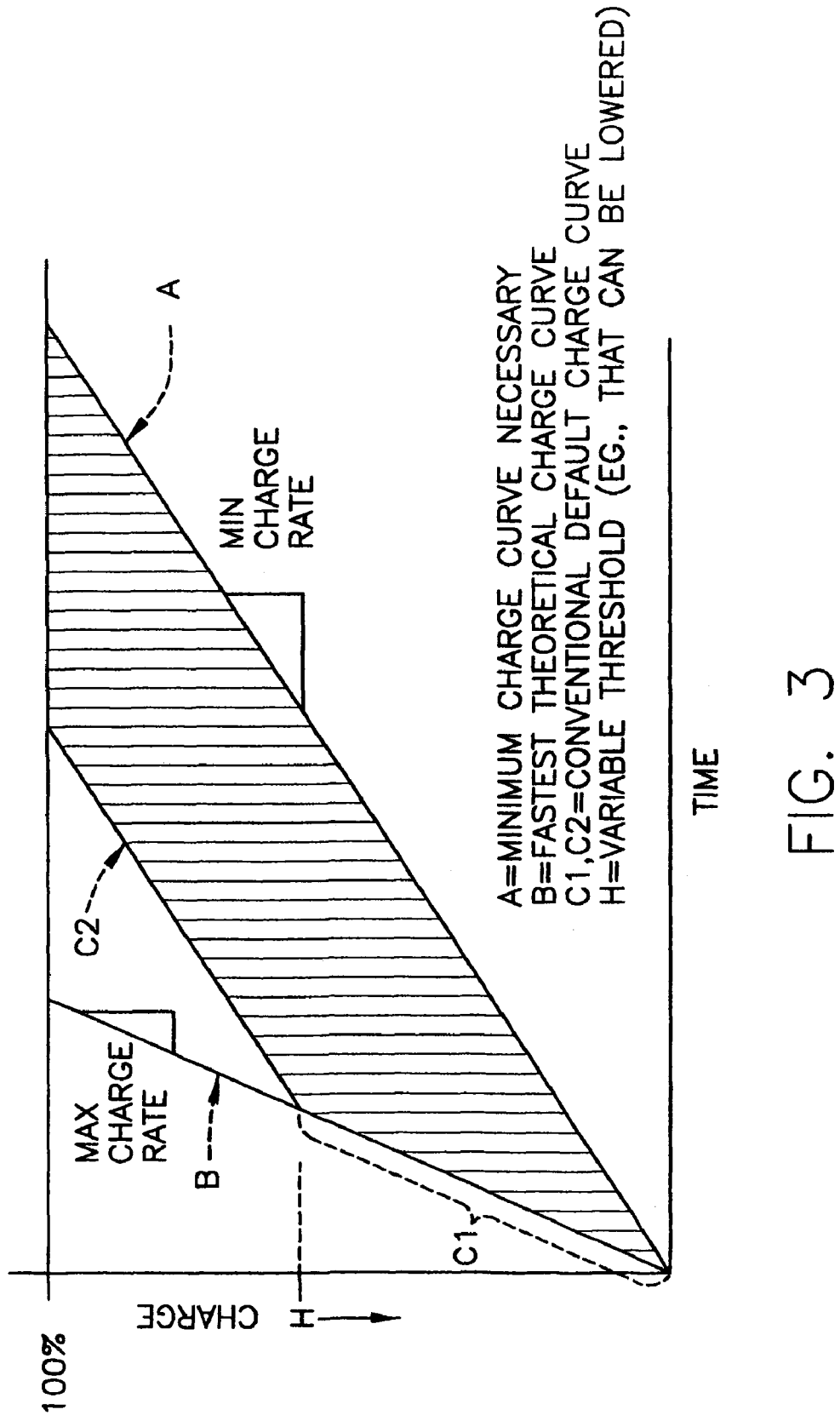
FIG. 3 graphically illustrates conditions for a charging protocol.

FIG. 3 graphically illustrates conditions for a charging protocol in accordance with at least one presently preferred embodiment of the present invention. With time on the horizontal (x) axis and battery level or charge (as a percentage of battery capacity) on the vertical (y) axis, curves A and B indicate, respectively, the minimum charge rate and maximum charge rate that can be applied to a (hypothetical) battery. Accordingly, the combination of curves C1 and C2 indicates a conventional charge protocol, whereby below a given threshold (H), the charge protocol (C1) is "fast" and thus coincident with curve B while, above the threshold, the charge protocol (C2) is "slow" and thus parallel to curve A. As such, the shaded area between curves A and C2 represents, in accordance with at least one presently preferred embodiment of the present invention, variable charging curves that can be effected if the threshold H is variably lowered.

"Movement" of the variable threshold H can be governed by essentially any reasonable protocol that would allow for slow-charging at times when the computer is likely not to be used for long periods of time. Thus, for instance, a calendar-based approach could be employed wherein a user's system calendar could be consulted to the extent that the calendar is understood to enumerate events that do not involve use of a computer.

Figure 4:
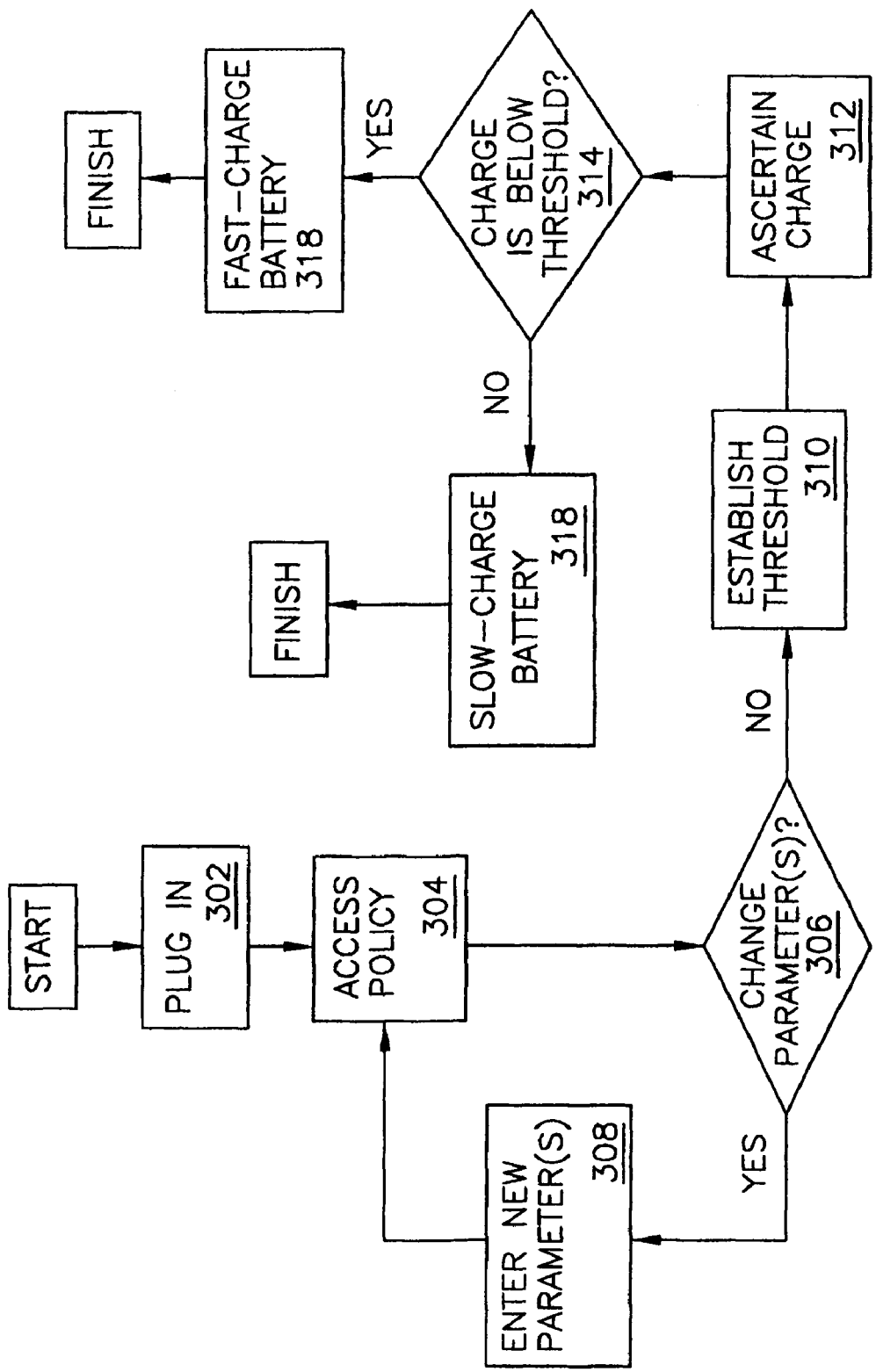
FIG. 4 schematically illustrates a general process for battery charge management

FIG. 4 schematically illustrates a general process for battery charge management that may be employed in accordance with a preferred embodiment of the present invention. At the start, the system (e.g., notebook/laptop) is running but not plugged in. Accordingly, after the system is plugged in (302), and thus in a position to charge the battery, the charging policy at hand is accessed (304) and then (in a preferred embodiment of the present invention), the user is queried as to whether he/she wants to change one or more parameters of the policy (306). If yes, new parameters are entered (308), the policy is updated and accessed again (304) and the user can conceivably be given another opportunity to change another parameter (306). If no, or no more, parameters are to be changed, then the variable threshold as discussed hereabove is preferably set in accordance with the policy (310). After ascertaining the current battery charge (level) (312), this is compared to the threshold (314) to determine whether to fast-charge (316) (below threshold) or slow-charge (318) (above threshold).

As can be appreciated from FIG. 4, the policy for varying the battery charge threshold can be governed automatically, via direct user input, or both. For instance, one user query (306) could ask how long the user expects to keep the computer plugged in at present, i.e., not unplug the computer and carry it elsewhere (regardless of how long the user might presently stay in a session). If the prospective length of time for keeping it plugged in is equal to or greater than that needed for slow-charging, then this can accordingly lower the battery level threshold that delineates slow-charging from fast-charging. The user can also take the opportunity to modify his/her computer calendar, whereby calendar events (either by default or via a "flag" that can be activated by the user) can be understood as times during which the computer will not be plugged in. Thus, the a battery management unit or charge control arrangement could, as a matter of policy, automatically consult the calendar then or at future times to determine how long the computer conceivably will be plugged in and, thus, in a position to slow-charge or fast-charge as determined by the threshold (itself governable by the prospective time available between calendar events). Of course, at any time, if the prospective time available for charging is greater than the actual time available (e.g., if the user unplugs the computer earlier than expected before a calendar event or before a time that was input by the user in step 306), then the policy may conceivably default to the "conventional" policy that is solely based on battery charge and that has a higher threshold for delineating slow-charging from fast-charging.

A "smart" policy, as conceivably preprogrammed, can easily track a user's history of plugging in a computer and thus create a probability matrix that could ascertain, within a comfortable margin of error, the likelihood, at a given time of day, week or month, that the computer will remain plugged in for a given length of time. (As such, the policy can make an "educated guess", e.g., that at time x on day of the week y, the computer will likely be plugged in for z more hours.) Further, if at any time a program initiates (such as a compiler or video rendering) that is known (e.g., from historical data) to run for long periods of time while being plugged in, then this can affect where the threshold is set.

It should be generally understood that, whereas examples in accordance with at least one embodiment of the present invention, as set forth hereinabove, have focused on the environment of a laptop or notebook, the battery management protocols broadly contemplated herein can of course be employed in a very wide variety of mobile device settings, such as with cell phones and personal data assistants.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
   a battery for providing power to said apparatus;
   a medium for connection to an AC power source; and
   a battery charge manager which manages charging of said battery during connection of said connection medium with an AC power source;
   said battery charge manager acting to lower a threshold amount of battery capacity at which a slow-charge is applied to said battery
   responsive to determining enough time is available for slow-charging said battery.

2. The apparatus according to claim 1, wherein said apparatus comprises a laptop, said laptop comprising a main memory and a system processor, said battery acting to power said main memory and said system processor.

3. The apparatus according to claim 1, wherein said battery charge manager acts to:
   lower the threshold responsive to determining sufficient downtime is available for slow-charging the battery; and
   increase the threshold responsive to determining insufficient downtime is available for slow-charging the battery.

4. The apparatus according to claim 3, wherein said battery charge manager acts to lower the threshold battery charge as a function of time ascertained to be available for slow-charging said battery.

5. The apparatus according to claim 4, wherein said battery charge manager acts to lower the threshold battery charge responsive to a user-input parameter.

6. The apparatus according to claim 4, wherein said battery charge manager acts to lower the threshold battery charge responsive to ascertaining historical data relating to connection of said connection medium with an AC power source.

7. The apparatus according to claim 4, wherein said battery charge manager acts to lower the threshold battery charge responsive to calendar data.

8. The apparatus according to claim 1, wherein said battery charge manager comprises a charge control arrangement disposed separately from said battery and in said mobile device.

9. The apparatus according to claim 1, wherein said battery charge manager comprises a battery management unit disposed in said battery.

10. A method comprising:
    connecting a mobile device to an AC power source;

thereafter charging a battery of the mobile device; and managing the charging of the battery to lower a threshold amount of battery capacity at which a slow-charge is applied to said battery responsive to determining enough time is available for slow-charging said battery.

11. The method according to claim 10, wherein the mobile device comprises a laptop.

12. The method according to claim 10, wherein said varying comprises:

ascertaining available time for slow-charging the battery; and varying the threshold battery charge based on time ascertained to be available for slow-charging the battery.

13. The method according to claim 12, wherein said varying of the threshold battery charge based on time comprises lowering the threshold battery charge as a function of time ascertained to be available for slow-charging the battery.

14. The method according to claim 13, wherein:

said managing further comprises accepting a user-input parameter; and said lowering comprises lowering the threshold battery charge responsive to the accepted user-input parameter.

15. The method according to claim 13, wherein:

said managing further comprises ascertaining historical data relating to connection of the mobile device with an AC power source; and said lowering comprises lowering the threshold battery charge based on the ascertained historical data.

16. The method according to claim 13, wherein:

said managing further comprises ascertaining calendar data; and said lowering comprises lowering the threshold battery charge based on the ascertained calendar data.

17. A program storage device readable by machine, tangibly embodying a program of instructions executable by the machine to perform a method comprising:

connecting a mobile device to an AC power source;

thereafter charging a battery of the mobile device; and managing the charging of the battery to lower a threshold amount of battery capacity at which a slow-charge is applied to said battery responsive to determining enough time is available for slow-charging said battery.

\* \* \* \* \*